(12) United States Patent
Sitaram et al.

(10) Patent No.: US 10,165,491 B1
(45) Date of Patent: Dec. 25, 2018

(54) CONTROLLING DOWNLINK HANDOVER-PROCESSING THRESHOLD BASED ON UPLINK TTI BUNDLING

(71) Applicant: Sprint Spectrum L.P., Overland Park, KS (US)

(72) Inventors: Krishna Sitaram, Chantilly, VA (US); Hemanth B. Pawar, Brambleton, VA (US); Shilpa K. Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/730,348

(22) Filed: Oct. 11, 2017

(51) Int. Cl.
| | | |
|---|---|---|
| *H04W 36/14* | (2009.01) | |
| *H04W 72/14* | (2009.01) | |
| *H04W 24/08* | (2009.01) | |
| *H04W 36/00* | (2009.01) | |
| *H04W 4/00* | (2018.01) | |
| *H04W 36/30* | (2009.01) | |
| *H04W 56/00* | (2009.01) | |
| *H04W 36/38* | (2009.01) | |
| *H04W 36/08* | (2009.01) | |
| *H04W 72/08* | (2009.01) | |

(52) U.S. Cl.
CPC ....... *H04W 36/30* (2013.01); *H04W 36/0088* (2013.01); *H04W 36/38* (2013.01); *H04W 56/0005* (2013.01); *H04W 36/08* (2013.01); *H04W 56/0045* (2013.01); *H04W 72/08* (2013.01)

(58) Field of Classification Search
CPC ... H04W 72/042; H04W 36/14; H04W 52/20; H04W 74/0833; H04W 36/0083; H04W 72/14; H04W 24/08; H04W 36/00; H04W 4/00
USPC ...... 370/329, 252; 455/423, 437, 435.2, 434
See application file for complete search history.

(56) References Cited

U.S. PATENT DOCUMENTS

| | | | | |
|---|---|---|---|---|
| 8,737,336 | B2 * | 5/2014 | Lohr | H04W 72/042 370/329 |
| 8,848,547 | B2 * | 9/2014 | Alanara | H04B 17/0067 370/252 |
| 8,855,647 | B2 * | 10/2014 | Li | H04W 36/0055 455/437 |
| 8,954,070 | B2 * | 2/2015 | Welnick | H04W 48/18 370/241 |
| 8,995,996 | B2 * | 3/2015 | Bims | H04L 1/0033 370/329 |
| 9,565,676 | B1 * | 2/2017 | Kothari | H04L 5/0098 |
| 9,585,072 | B1 * | 2/2017 | Liu | H04W 36/14 |
| 9,872,258 | B1 * | 1/2018 | Mansour | H04W 52/343 |
| 9,888,499 | B2 * | 2/2018 | Dinan | H04W 56/0005 |
| 9,913,181 | B1 * | 3/2018 | Oroskar | H04W 36/0083 |
| 2012/0147830 | A1 * | 6/2012 | Lohr | H04W 72/042 370/329 |
| 2014/0256310 | A1 * | 9/2014 | Wang | H04W 24/08 455/423 |
| 2016/0066223 | A1 | 3/2016 | Sawhney et al. | |

(Continued)

*Primary Examiner* — William D Cumming

(57) ABSTRACT

A method and system for dynamically managing a downlink coverage threshold that is used for triggering handover processing of a user equipment device (UE). The downlink coverage threshold is dynamically decreased upon invoking of uplink Transmission Time Interval (TTI) bundling service for the UE.

20 Claims, 4 Drawing Sheets

(56) References Cited

U.S. PATENT DOCUMENTS

2018/0049217 A1* 2/2018 Dinan ................ H04W 72/048
2018/0092122 A1* 3/2018 Babaei ................ H04W 72/14

* cited by examiner

CONTROLLING DOWNLINK HANDOVER-PROCESSING THRESHOLD BASED ON UPLINK TTI BUNDLING

BACKGROUND

A typical wireless communication system includes a number of base stations each providing coverage in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and/or the Internet. With this arrangement, a UE within coverage of the system could engage in air interface communication with a base station and could thereby communicate via the base station with various remote network entities or with other UEs served by the base station.

Such a system could operate in accordance with an radio access technology (RAT), examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each RAT could define its own procedures for registration of UEs, initiation of communications, handover of UEs between base station coverage areas, and other functions.

Per the RAT, each base station coverage area could define an air interface for carrying communications between the base station and UEs, including a downlink from the base station to UEs and an uplink from UEs to the base station. In practice, the air interface could occupy a carrier, which could be frequency division duplex (FDD), having separate ranges of frequency for downlink and uplink communication, or time division duplex (TDD), having a single range of frequency multiplexed over time between downlink and uplink use. Further, the air interface could be divided over time into transmission time intervals (TTIs), and communication on the air interface could occur on a per-TTI basis.

Under a representative RAT, the air interface could define various resources and channels for carrying particular communications. On the downlink, for instance, the air interface could define a reference channel carrying a broadcast reference signal that UEs can measure to evaluate downlink coverage quality, the air interface could define various other downlink control channels for carrying control signaling to UEs, and the air interface could define one or more downlink traffic channels with resources allocable on an as-needed basis to carry bearer data (e.g., application-layer communications) and other information to UEs. And the uplink, the air interface could define an access channel for carrying UE access requests to the base station, the air interface could define various other uplink control channels for carrying control signaling to the base station, and the air interface could define one or more uplink traffic channels with resources allocable on an as-needed basis to carry bearer data and other information to the base station.

When a UE initially enters into coverage of such a system, the UE could scan for a best base station coverage area in which to operate, and the UE could then engage in signaling with and via the base station, to register for service. For instance, the UE could evaluate the reference signal from each available coverage area to identify the coverage area with the best downlink coverage (e.g., downlink receive signal strength such as reference-signal receive power (RSRP) or received signal strength indicator (RSSI), or downlink signal-to-noise ratio such as reference-signal receive quality (RSRQ), signal-to-interference-plus-noise (SINR), C/I, Ec/Io, etc.) And the UE could then engage in signaling with the associated base station, to register for service.

The UE could then be served by the base station in a connected mode or an idle mode. In the connected mode, the UE would have an established radio-link-layer connection with the base station through which the UE and base station could exchange bearer data, facilitating communication by the UE on an external transport network, for instance. And in the idle mode, the UE would not have an established radio-link-layer connection with the base station but could periodically check for paging from the base station and could transition to the connected mode when necessary to engage in bearer communication.

When so served, the UE could also regularly monitor the quality of downlink coverage from its serving base station and could periodically report measured downlink coverage level (e.g., downlink receive signal strength and/or downlink receive signal quality) to its serving base station. And if and when the base station determines that the UE's measured downlink coverage level is threshold low, the base station could coordinate handover of the UE to another coverage area. Further, if and when the UE detects that the downlink coverage level is threshold low, the UE could responsively transmit a measurement report to its serving base station, to trigger possible handover of the UE to another coverage area.

For this purpose, the base station could apply a downlink coverage threshold value (e.g., threshold downlink receive signal strength and/or threshold downlink receive signal quality) to trigger handover processing of the UE. For instance, the base station could itself be provisioned with the downlink coverage threshold value and could be configured to determine when the UE's reported downlink coverage drops to that threshold level and to responsively take action to facilitate handover of the UE (e.g., then directing the UE to report adjacent downlink coverage and/or coordinating handover of the UE to adjacent coverage) Further, the base station could provision the UE with the downlink coverage threshold value, directing the UE to determine when the UE's downlink coverage drops to that threshold level and to responsively provide a measurement report to the base station to facilitate possible handover of the UE.

Overview

In practice, this downlink coverage threshold value for triggering handover processing be established based on engineering analysis of performance metrics. For example, a wireless service provider could collect data on a per-coverage-area basis indicating the downlink coverage level at which UEs tend to lose connectivity (e.g., what the downlink signal strength or quality is when UEs tend to experience dropped calls/communications). The service provider could then set the downlink coverage threshold to a level that is somewhat higher than that determined point, to help trigger possible handover instead of allowing a UE's downlink coverage to drop so low that the UE loses connectivity.

While this may work in theory, however, it turns out that a reason for UEs experiencing loss of connectivity in some situations may actually be poor uplink communication quality, perhaps more than poor downlink coverage. This could be the case especially for battery powered UEs with limited uplink transmission power, served by a base station with higher downlink transmission power. As such a UE moves away from its serving base station while in the connected mode, the UE may reach a point where the UE's uplink communication does not successfully reach the base station (e.g., where the uplink communication arrives at the base station with threshold high error) but where the UE's downlink coverage from the base station is not yet threshold low (e.g., where the base station's downlink communication still successfully reaches the UE). Consequently, poor uplink communication quality could lead to loss of connectivity even though downlink coverage is sufficient.

If the downlink coverage threshold for triggering handover processing is set based on an evaluation of what the downlink coverage level is when UEs tend to lose connectivity, and if a UE's loss of connectivity is a result of poor uplink communication quality more than poor downlink coverage, it follows that if the UE's uplink communication quality can be improved, the downlink coverage threshold for triggering handover processing could be reduced. That is, if a UE's uplink communication is improved, the UE could then in theory move farther away from its serving base station before the UE's uplink communication quality becomes so poor that the UE loses connectivity with the base station. And as the UE moves farther away from the base station, the UE's downlink coverage from the base station would become weaker. Therefore, the downlink coverage level at which the UE would tend to lose connectivity as a result of poor uplink communication quality would be lower.

One way to help improve a UE's uplink communication quality is to implement uplink TTI bundling service. With uplink TTI bundling, when a UE has a block of data to transmit to its serving base station, the UE automatically transmits the data repeatedly in multiple consecutive TTIs before waiting for a Hybrid Automatic Repeat Request (HARQ) response from the base station indicating whether the base station successfully received the data. When the UE has data to transmit, the base station could direct the UE to transmit the data using TTI bundling, and the UE could then responsively transmit the data in each of multiple consecutive TTIs, possibly with varying error-correction coding in each TTI, thus helping to increase the likelihood of successful receipt of the data by the base station. TTI bundling might improve uplink communication quality by up to 4 dB (e.g., by allowing more successful uplink communication at a given uplink transmission power).

In practice, a base station could invoke uplink TTI bundling service for a served UE in response to detecting one or more TTI-bundling triggers that indicate the UE's uplink coverage is threshold poor and that uplink TTI bundling might be useful. For example, the base station could invoke uplink TTI bundling service for the UE in response to the base station determining that the uplink SINR from the UE is threshold low, that the UE has threshold low power headroom (remaining available uplink transmission power), or that the UE's uplink communication quality is otherwise threshold poor.

In view of the foregoing, disclosed herein is a method and system for dynamically managing the downlink coverage threshold that is used for triggering handover processing of a UE. In accordance with the disclosure, the downlink coverage threshold will be dynamically decreased upon invoking of uplink TTI bundling service for the UE. For instance, when the base station determines that conditions are such that the base station should invoke TTI bundling service for the UE, the base station could responsively both (i) invoke TTI bundling service for the UE and (ii) decrease the downlink coverage threshold that is used for triggering handover processing of the UE. Phrased another way, when the base station invokes TTI bundling service for the UE, the base station could responsively also decrease the downlink coverage threshold that the base station applies for triggering handover processing of the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example RAT and associated network arrangement. However, it will be understood that principles of the disclosure can extend to apply in other scenarios as well. Further, even within the context of LTE, numerous variations from the details disclosed herein may be possible. For instance, elements, arrangements, and operations may be added, removed, combined, distributed, or otherwise modified. In addition, it will be understood that operations described here as being performed by one or more entities could be implemented in various ways, such as by a processing unit executing software instructions for instance.

Figure 1:
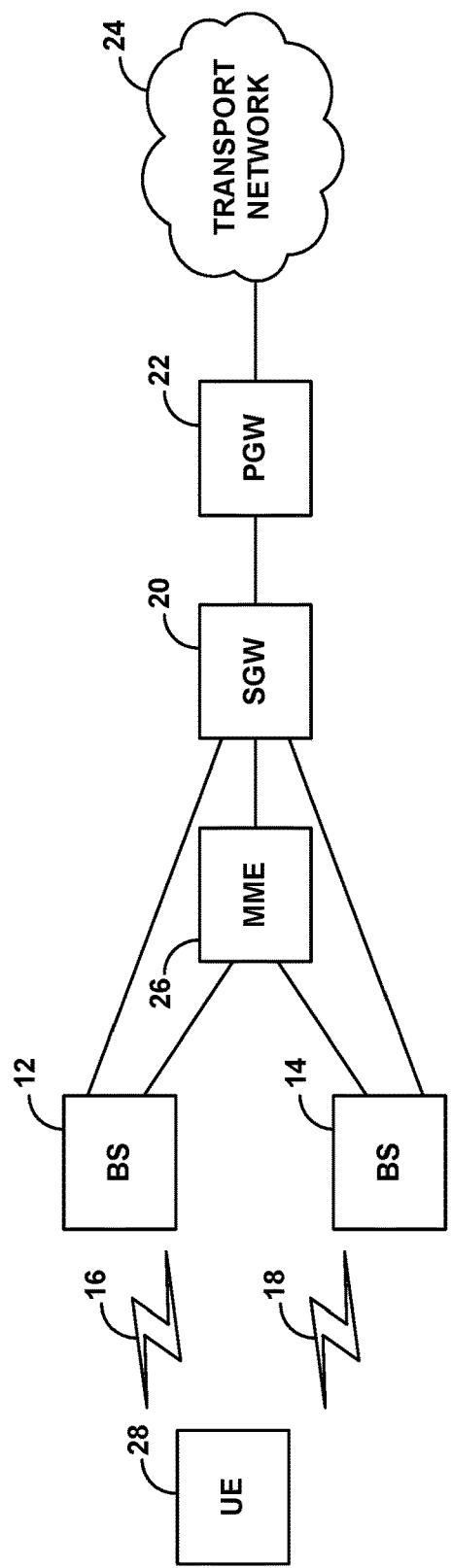
FIG. 1 is a simplified block diagram of a wireless communication system in which the present method and system can be implemented.

Referring to the drawings, as noted above, FIG. 1 is a simplified block diagram of a wireless communication system in which features of the present disclosure can be implemented. In particular, FIG. 1 depicts an example LTE network.

As shown, the example LTE network includes representative LTE base stations 12, 14 (evolved Node-Bs or "eNodeBs") (e.g., macro base station, small cell, relay, or other type of base station) providing respective wireless coverage areas 16, 18 each defining a respective LTE air interface. Each base station then has a communication interface with a serving gateway (SGW) 20, which in turn has a communication interface with a packet-data network gateway (PGW) 22, which provides connectivity with a transport network 24 such as the Internet. Further, the base stations 12, 14 and SGW 20 have communication interfaces with a mobility management entity (MME) 26. These components of the LTE network could sit as nodes on a core packet-switched network operated by an LTE service provider, and the interfaces between the components could be virtual tunnels defined within that core network.

Under LTE, each air interface operates on a carrier, which could be FDD or TDD as noted above. On the downlink and/or uplink, the carrier could span a frequency bandwidth, such as 1.4 MHz, 3 MHz, 5 MHz, 10 MHz, 15 MHz, or 20 MHz, among other possibilities. In addition, the air interface is divided over time into a continuum of 10-millisecond frames, each of which is then further divided into ten 1-millisecond subframes or TTIs. In each TTI, the carrier bandwidth is then divided into 180-kHz-wide frequency blocks, referred to as physical resource blocks (PRBs), that can be modulated to carry data between the base station and UEs. And the base station is configured to allocate those PRBs for use to carry data on an as-needed basis. For instance, when the base station has data to send to a UE, the base station could allocate certain PRBs of a TTI on the downlink to carry that data and could transmit the data to the UE in those allocated PRBs of the TTI. And when a UE has data to send to the base station, the UE could send a scheduling request to the base station, the base station could allocate certain PRBs of an upcoming TTI on the uplink to carry the data, and the UE could then transmit the data to the base station in the allocated PRBs of that TTI.

The LTE downlink is divided over its frequency bandwidth into 15-kHz subcarriers, which are divided into groups of twelve to define the 180-kHz-wide downlink PRBs. Further, each TTI is divided over time into 14 symbol time segments each about 66.7 microseconds long. Thus, the downlink defines an array of resource elements each occupying a 15-kHz subcarrier and spanning 66.7 microseconds. And each PRB encompasses 12×14=168 resource elements. These resource elements could then be modulated using an agreed modulation scheme to carry bits of data from the base station to a UE.

LTE reserves certain of these downlink resource elements for special use. For instance, the resource elements across the downlink bandwidth in the first one, two, or three symbol time segments per TTI are generally reserved to define a downlink control region for carrying control signaling, such as PRB scheduling directives, from the base station to served UEs. And the resource elements in the remaining symbol time segments per TTI are generally reserved to define a shared channel region for carrying data in PRBs as scheduled by the eNodeB. Further, various resource elements distributed throughout the downlink bandwidth are reserved to carry a reference signal as noted above.

The LTE uplink, like the downlink, is divided over its frequency bandwidth into 15-kHz subcarriers, which are divided into groups of twelve to define 180-kHz-wide uplink PRBs, and each PRB is divided into resource elements that can be modulated to carry bits of data from the UE to the base station. On the uplink, however, each resource element may be effectively spread across the twelve subcarriers of the PRB rather than occupying just a single subcarrier, and may span a shorter duration of time within the PRB.

LTE also reserves certain of these uplink resource elements for special use. For instance, certain uplink PRBs as the low end and high end of the uplink frequency bandwidth in each TTI are generally reserved to define an uplink control region for carrying control signaling, such as scheduling requests from served UEs to the eNodeB. And the remaining uplink PRBs are generally reserved to define an uplink shared channel region for carrying data in PRBs as scheduled by the eNodeB.

FIG. 1 depicts a representative UE 28 within coverage of base station 12. This UE could take various forms, such as any of those noted above for instance.

When UE 28 initially enters into coverage of the LTE network, the UE could discover coverage of base station 12 and could then engage in a process to register for service. For instance, the UE could engage in random access signaling and Radio Resource Control (RRC) signaling with the base station to establish an RRC connection (radio-link-layer connection) for the UE. Further, the UE could engage in an attach process, through which the MME 26 could authenticate the UE and coordinate setup of one or more bearer tunnels for carrying communications between the UE and the PGW 22 (and thus between the UE and the transport network 24).

Once the UE is attached with the network and served by the base station, the base station could then coordinate air interface communication with the UE as necessary.

Considering uplink communication, for instance, when the UE has a block of data to transmit on transport network 24, the UE could send a scheduling request to the base station. And in response, the base station could then select PRBs of an upcoming TTI to carry the requested communication and could transmit to the UE a downlink control information (DCI) message to cause the UE to transmit the block of data in the selected PRBs of that upcoming TTI. At the designated time, the UE could then transmit the data to the base station in the designated PRBs.

As noted above, the base station and UE could also make use of uplink TTI bundling to help improve quality of the UE's communication to the base station when appropriate. As indicated above, without limitation, two example triggers for invoking uplink TTI bundling service for a UE are threshold low power headroom and threshold low uplink SINR.

The UE could report its power headroom to the base station periodically or in certain other situations, and the base station could evaluate the UE's reported power headroom and determine when it is lower than a configured threshold level that is deemed sufficiently low to justify application of uplink TTI bundling. When the base station determines that the UE's power headroom is threshold low, the base station could then invoke uplink TTI bundling service for the UE to help improve quality of the UE's uplink communication.

In addition or alternatively, the base station could evaluate the UE's uplink SINR based on an evaluation of UE transmissions received by the base station, and the base station could likewise determine when the uplink SINR is lower than a configured threshold that is deemed sufficiently low to justify application of uplink TTI bundling. When the base determines that the UE's uplink SINR is threshold low, the baes station could then invoke uplink TTI bundling service for the UE to help improve quality of the UE's uplink communication.

To invoke uplink TTI bundling service for a UE, the base station could record in a context record for the UE an indication that the base station is to apply TTI bundling service when scheduling transmission from the UE. And in line with that indication or otherwise, when the base station schedules transmission of a block of data from the UE, the base station could direct the UE to use TTI bundling for the transmission. In particular, rather than allocating PRBs in just a single TTI for the UE's transmission, the base station could allocate PRBs in each of a series of consecutive uplink TTIs for the UE to repeatedly engage in the transmission. In the DCI message that the base station sends to the UE to direct the UE to engage in the uplink transmission, the base station could then specify the multiple TTIs (e.g., count of TTIs) in which the UE is to repeatedly engage in the transmission as well as the PRBs that the UE is to use in those TTIs. And the UE could then responsively apply TTI bundling as directed.

As further indicated above, when a UE is served by a base station, the base station could apply a downlink coverage threshold (e.g., downlink receive signal strength and/or downlink receive signal quality) as a basis to trigger handover processing of the UE.

In practice, the act of the base station applying the downlink coverage threshold could involve the base station providing the UE with a directive for the UE to determine and report to the base station when the UE's downlink coverage from the base station meets the downlink coverage threshold. For instance, the base station could transmit to the UE an RRC connection reconfiguration message or other configuration message that specifies the downlink coverage threshold, as an "A2" measurement event for example. And the UE could be configured to respond to that message by setting itself to determine when its downlink coverage from the base station meets the downlink coverage threshold, perhaps with some hysteresis, and to responsively report the downlink coverage to the base station to trigger handover processing of the UE.

The UE could be configured to report its downlink coverage level to the base station periodically and/or in response to determining when a configured downlink coverage threshold is met. And the act of the base station applying the downlink coverage threshold could then involve the base station determining whether the UE's reported downlink coverage level is lower than a configured downlink coverage threshold, and the base station triggering handover processing of the UE in respond to determining that the UE's reported downlink coverage level is lower than that threshold.

Handover processing of the UE could then involve the base station directing the UE to scan for other coverage for possible handover. For instance, the base station could transmit to the UE an RRC connection reconfiguration message or other configuration message that provides the UE with an "A3", "A4", or "A5" measurement event that causes the UE to evaluate neighboring coverage possibly by way of comparison with coverage from the UE's serving base station and to report to the base station when the UE detects sufficiently strong neighboring coverage.

Further, the handover processing of the UE could involve the base station engaging in signaling to process handover of the UE. For instance, the base station could engage in signaling with a target base station to prepare the target base station to serve the UE, and the base station could then transmit to the UE an RRC connection reconfiguration message or other message that directs the UE to transition from being served by the base station to being served instead by the handover target.

As further discussed above, the present disclosure provides for dynamically adjusting the downlink coverage threshold used for triggering handover processing of the UE, with the dynamic adjustment accounting for the invocation of uplink TTI bundling for the UE. Namely, when the base station invokes uplink TTI bundling for the UE, the base station could also (e.g., responsively) decrease the downlink coverage threshold used for triggering handover processing of the UE, on grounds that the uplink TTI bundling could enable the UE to operate with reduced coverage before the UE would likely lose connectivity. Further, if and when the base station then discontinues application of uplink TTI bundling for the UE, the base station could then correspondingly increase the downlink coverage threshold (e.g., revert to a configured default downlink coverage threshold) for triggering handover processing of the UE.

To decrease the downlink coverage threshold that the base station applies for triggering handover processing of the UE, and thus to apply the decreased downlink coverage threshold for triggering handover processing of the UE, the base station could set itself to compare the UE's reported downlink coverage level with the decreased downlink coverage threshold rather than the default configured downlink coverage threshold. Further the base station could provision the UE with the decreased downlink coverage threshold, such as by transmitting to the UE an RRC connection reconfiguration message or other configuration message that provides the UE with a revised A2 measurement event specifying the decreased downlink coverage threshold, thus directing the UE to report to the base station when the UE's downlink coverage level from the base station meets the decreased downlink coverage threshold. Other implementations are possible as well.

Figure 2:
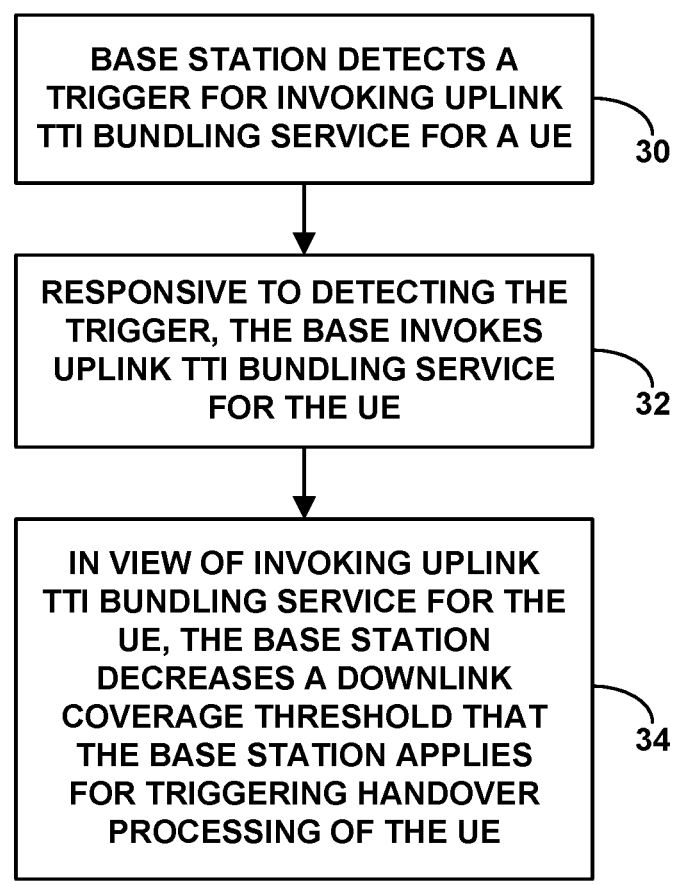
FIG. 2 is a flow chart depicting example operations in accordance with the disclosure.

FIG. 2 is a flow chart depicting a method in line with the discussion above, to control handover processing of a UE, in a scenario where a base station serves the UE over an air interface defining a downlink from the base station to the UE and an uplink from the UE to the base station, and where, while serving the UE, the base station applies a downlink coverage threshold for triggering handover processing of the UE. As shown in FIG. 2, at block 30, the base station detects a trigger for invoking uplink TTI bundling service for the UE. At block 32, responsive to detecting the trigger, the base invokes uplink TTI bundling service for the UE. Further, at block 34 (which could be concurrent with block 32), in view of invoking uplink TTI bundling service for the UE, the base station decreases the downlink coverage threshold that the base station applies for triggering handover processing of the UE.

As discussed above, decreasing the downlink coverage threshold that the base station applies for triggering handover processing of the UE could thereby enable the UE to operate with reduced downlink coverage before handover of the UE gets triggered. In fact, use of the decreased downlink coverage threshold may ultimately obviate the need for handover altogether.

Further, as discussed above, the method could additionally involve, while serving the UE, the base station broadcasting a reference signal, in which case the downlink coverage threshold could comprise a threshold low level of the reference signal at the UE, such as a threshold low RSRP and/or a threshold low RSRQ.

Figure 3:
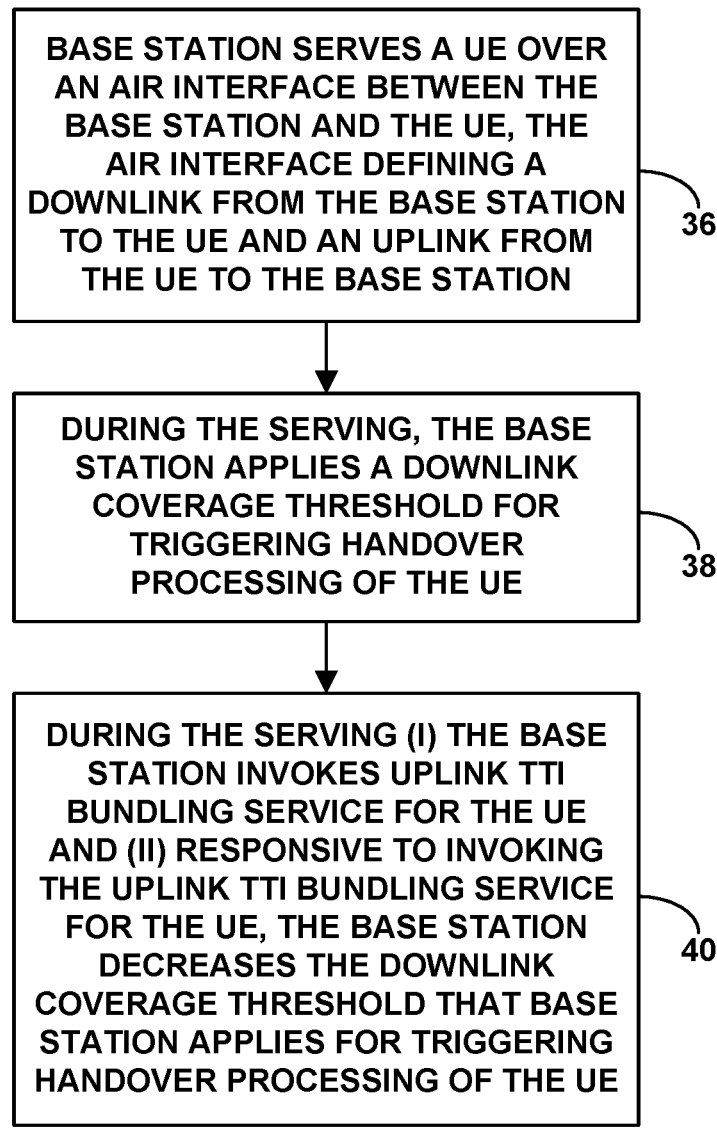
FIG. 3 is another flow chart depicting example operations in accordance with the disclosure.

FIG. 3 is another flow chart depicting a method in line with the discussion above, to control handover processing of a UE. As shown in FIG. 3, at block 36, the method includes a base station serving the UE over an air interface between the base station and the UE, the air interface defining a downlink from the base station to the UE and an uplink from the UE to the base station. Further, at block 38, the method includes, during the serving, the base station applying a downlink coverage threshold for triggering handover processing of the UE. And at block 40, the method includes, during the serving (i) the base station invoking uplink TTI bundling service for the UE and (ii) responsive to invoking the uplink TTI bundling service for the UE, the base station decreasing the downlink coverage threshold that the base station applies for triggering handover processing of the UE, so that the base station then applies a decreased downlink coverage threshold for triggering handover processing of the UE (which could enable the UE to operate with reduced downlink coverage before handover of the UE gets triggered and could thereby delay handover of the UE).

Various features discussed above can be applied in the context of this method, and vice versa.

For example, the act of the base station applying the downlink coverage threshold for triggering handover processing of the UE could involve the base station providing to the UE a directive for the UE to determine and report to the base station when downlink coverage from the base station meets the downlink coverage threshold, the report triggering a determination by the base station of whether to hand over the UE. Further, the act of the base station applying by the decreased downlink coverage threshold for triggering handover processing of the UE could involve the base station providing to the UE a revised directive for the UE to determine and report to the base station when downlink coverage from the base station meets the decreased downlink coverage threshold.

Alternatively or additionally, the act of the base station applying the downlink coverage threshold for triggering handover processing of the UE could involve the base station determining when downlink coverage at the UE meets the downlink coverage threshold, with the base station triggering handover processing of the UE in response to determining that the downlink coverage at the UE meets the downlink coverage threshold.

Further, the act of the base station invoking uplink TTI bundling service for the UE could involve the base station detecting at least one uplink-TTI-bundling trigger for the UE and the base station responding to the detected uplink-TTI-bundling trigger(s) by directing the UE to use uplink TTI bundling. For instance, the uplink-TTI-bundling trigger(s) could include threshold low power headroom at the UE and/or threshold low SINR for uplink communication from the UE. In addition, the act of directing the UE to use uplink TTI bundling could involve including in a DCI message to the UE a directive for the UE to automatically repeatedly transmit data to the base station in a sequence of TTIs.

Figure 4:
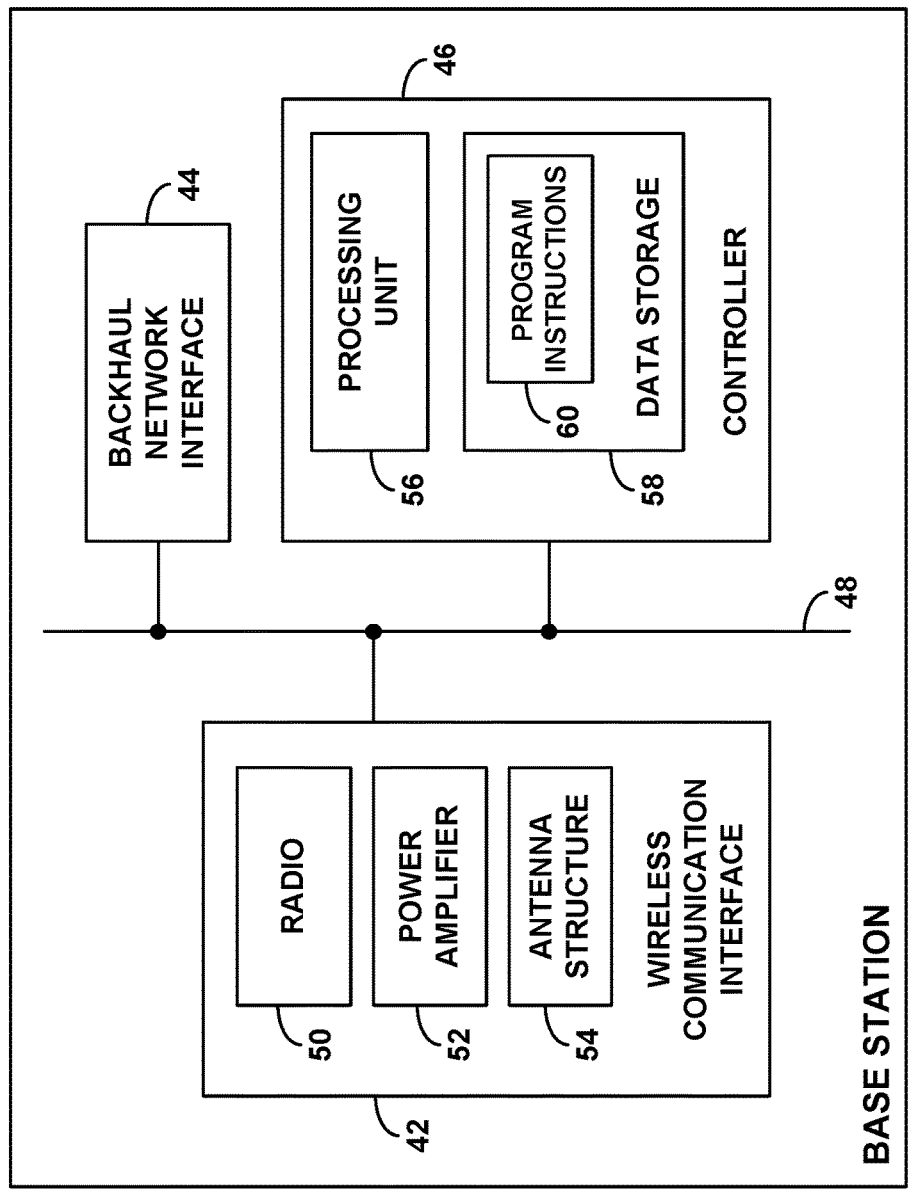
FIG. 4 is a simplified block diagram of an example base station operable in accordance with the disclosure.

Finally, FIG. 4 is a simplified block diagram of an example base station, showing some of the components that could be included in the base station to facilitate carrying out operations such as those described above. As shown, the example base station includes a wireless communication interface 42, a backhaul network interface 44, and a controller 46, any or all of which could be integrated together and/or communicatively linked together by a system bus, network, or other connection mechanism 48.

As shown, the wireless communication interface 42 includes a radio 50 for processing downlink communications and uplink communications, a power amplifier 52 for amplifying downlink communications, and an antenna structure 54 for wirelessly transmitting the downlink communication and wirelessly receiving the uplink communications. The backhaul network interface 44 then includes one or more network interface modules for coupling with a core network or the like. And the controller 46 includes a processing unit (e.g., one or more microprocessors) 56, non-transitory data storage (e.g. one or more volatile and/or non-volatile storage components such as magnetic, optical, or flash storage) 58, and program instructions 60 stored in the data storage and executable by the processing unit to carry out various base station operations such as those discussed above.

In practice, the base station (e.g., by way of its controller and wireless communication interface) is configured to apply a downlink coverage threshold for triggering handover processing of the UE, and the base station is configured such that, when the base station invokes uplink TTI bundling service for the UE, the base station responsively decreases the downlink coverage threshold that the base station applies for triggering handover processing of the UE.

Various features discussed above can be applied in this context as well, and vice versa.

Exemplary embodiments have been described above. Those skilled in the art will understand, however, that changes and modifications may be made to these embodiments without departing from the true scope and spirit of the invention.

What is claimed is:

1. A method of controlling handover processing of a user equipment device (UE), wherein a base station serves the UE over an air interface defining a downlink from the base station to the UE and an uplink from the UE to the base station, and wherein, while serving the UE, the base station applies a downlink coverage threshold for triggering handover processing of the UE, the method comprising:

while serving the UE, (i) detecting by the base station a trigger for invoking uplink Transmission Time Interval (TTI) bundling service for the UE, (ii) responsive to detecting the trigger, invoking by the base station uplink TTI bundling service for the UE, and (iii) in view of invoking uplink TTI bundling service for the UE, decreasing by the base station the downlink coverage threshold that the base station applies for triggering handover processing of the UE, wherein decreasing the downlink coverage threshold that the base station applies for triggering handover processing of the UE enables the UE to operate with reduced downlink coverage before handover of the UE gets triggered.

2. The method of claim 1, further comprising:

during the serving, broadcasting by the base station a reference signal, wherein the downlink coverage threshold comprises a threshold low level of the reference signal at the UE, the threshold low level of the reference signal being selected from the group consisting of threshold low reference-signal-receive-power (RSRP) and threshold low reference-signal-receive-quality (RSRQ).

3. A method of controlling handover processing of a user equipment device (UE), the method comprising:

serving, by a base station, the UE over an air interface between the base station and the UE, the air interface defining a downlink from the base station to the UE and an uplink from the UE to the base station;

during the serving, applying by the base station a downlink coverage threshold for triggering handover processing of the UE; and during the serving, (i) invoking by the base station uplink Transmission Time Interval (TTI) bundling service for the UE and (ii) responsive to invoking the uplink TTI bundling service for the UE, decreasing by the base station the downlink coverage threshold that the base station applies for triggering handover processing of the UE, wherein the base station then applies a decreased downlink coverage threshold for triggering handover processing of the UE.

4. The method of claim 3, further comprising:

during the serving, broadcasting by the base station a reference signal, wherein the downlink coverage threshold comprises a threshold low level of the reference signal at the UE, the threshold low level of the reference signal being selected from the group consisting of threshold low reference-signal-receive-power (RSRP) and threshold low reference-signal-receive-quality (RSRQ).

5. The method of claim 3, wherein applying by the base station the downlink coverage threshold for triggering handover processing of the UE comprises providing by the base station to the UE a directive for the UE to determine and report to the base station when downlink coverage from the base station meets the downlink coverage threshold, wherein the report triggers a determination by the base station of whether to hand over the UE.

6. The method of claim 5, wherein applying by the base station the decreased downlink coverage threshold for triggering handover processing of the UE comprises providing by the base station to the UE a revised directive for the UE to determine and report to the base station when downlink coverage from the base station meets the decreased downlink coverage threshold.

7. The method of claim 3, wherein applying by the base station the downlink coverage threshold for triggering handover processing of the UE comprises determining by the base station when downlink coverage at the UE meets the downlink coverage threshold, wherein the base station triggers handover processing of the UE in response to determining that the downlink coverage at the UE meets the downlink coverage threshold.

8. The method of claim 3, wherein invoking by the base station uplink TTI bundling service for the UE comprises detecting by the base station at least one uplink-TTI-bundling trigger for the UE and responding by the base station to the detected at least one uplink-TTI-bundling trigger by directing the UE to use uplink TTI bundling.

9. The method of claim 8, wherein the at least one uplink-TTI-bundling trigger comprises a trigger selected from the group consisting of (i) threshold low power headroom at the UE and (ii) threshold low signal-to-interference-plus-noise ratio (SINR) for uplink communication from the UE.

10. The method of claim 8, wherein directing the UE to use uplink TTI bundling comprises including in a downlink control information (DCI) message to the UE a directive for the UE to automatically repeatedly transmit data to the base station in a sequence of TTIs.

11. The method of claim 3, wherein decreasing the downlink coverage threshold that the base station applies for triggering handover processing of the UE enables the UE to operate with reduced downlink coverage before handover of the UE gets triggered and can thereby delay handover of the UE.

12. A base station operable to serve a user equipment device (UE) over an air interface between the base station and the UE, wherein the air interface defines a downlink from the base station to the UE and an uplink from the UE to the base station, the base station comprising:
a radio for processing downlink communications and uplink communications; and
an antenna structure for transmitting the downlink communications and receiving the uplink communications, wherein, when the base station is serving the UE, (i) the base station is configured to apply a downlink coverage threshold for triggering handover processing of the UE, and (ii) when the base station invokes uplink Transmission Time Interval (TTI) bundling service for the UE, the base station is configured to respond to the invoking of the uplink TTI bundling service for the UE by decreasing the downlink coverage threshold that the base station applies for triggering handover processing of the UE.

13. The base station of claim 12, wherein the base station is configured to broadcast a reference signal, wherein the downlink coverage threshold comprises a threshold low level of the reference signal at the UE, the threshold low level of the reference signal being selected from the group consisting of threshold low reference-signal-receive-power (RSRP) and threshold low reference-signal-receive-quality (RSRQ).

14. The base station of claim 12, wherein applying the downlink coverage threshold for triggering handover processing of the UE comprises providing to the UE a directive for the UE to determine and report to the base station when downlink coverage from the base station meets the downlink coverage threshold, wherein the report triggers a determination by the base station of whether to hand over the UE.

15. The base station of claim 12, wherein decreasing the downlink coverage threshold that the base station applies for triggering handover processing of the UE comprises providing to the UE a revised directive for the UE to determine and report to the base station when downlink coverage from the base station meets a decreased downlink coverage threshold.

16. The base station of claim 12, wherein applying the downlink coverage threshold for triggering handover processing of the UE comprises determining when downlink coverage at the UE meets the downlink coverage threshold, wherein the base station is configured to trigger handover processing of the UE in response to determining that the downlink coverage at the UE meets the downlink coverage threshold.

17. The base station of claim 12, wherein invoking uplink TTI bundling service for the UE comprises detecting at least one uplink-TTI-bundling trigger for the UE and responding to the at least one detected uplink-TTI-bundling trigger by directing the UE to use uplink TTI bundling.

18. The base station of claim 17, wherein the at least one uplink-TTI-bundling trigger comprises a trigger selected from the group consisting of (i) threshold low power headroom at the UE and (ii) threshold low signal-to-interference-plus-noise ratio (SINR) for the uplink communication from the UE.

19. The base station of claim 17, wherein directing the UE to use uplink TTI bundling comprises including in a downlink control information (DCI) message to the UE a directive for the UE to automatically repeatedly transmit data to the base station in a sequence of TTIs.

20. The base station of claim 12, wherein decreasing the downlink coverage threshold that the base station applies for triggering handover processing of the UE enables the UE to operate with reduced downlink coverage before handover of the UE gets triggered and can thereby delay handover of the UE.

* * * * *